Aug. 9, 1966 L. RINDERER 3,265,939

SUPERCONDUCTIVE COIL HAVING A FERROMAGNETIC LAYER THEREON

Filed Sept. 20, 1963

United States Patent Office 3,265,939
Patented August 9, 1966

3,265,939
SUPERCONDUCTIVE COIL HAVING A FERROMAGNETIC LAYER THEREON
Leo Rinderer, Lausanne, Switzerland, assignor to National Research Corporation, Cambridge, Mass., a corporation of Massachusetts
Filed Sept. 20, 1963, Ser. No. 310,290
5 Claims. (Cl. 317—158)

This invention relates to superconductive materials wound in coils as solenoids, armatures and the like, and more particularly to the protection of coils wound from materials having discrete layers of different materials.

In the copending application of Allen and Stauffer, S.N. 133,653, filed August 24, 1961, there is disclosed a superconductor comprising a substrate of niobium with a thin surface diffusion layer of superconductive niobium stannide. In the copending application of Saur, S.N. 208,925, filed July 10, 1962, there are also disclosed superconductive materials comprising a substrate of niobium, vanadium, or tantalum and a surface diffusion layer of a superconducting substrate base alloy, e.g. $Nb_3Al$, on a niobium substrate $V_3Ga$ on a vanadium substrate, $Nb_3In_{.5}Sn_{.5}$ on a niobium substrate, etc. The surface diffusion coating is formed as the reaction product of the substrate and a metal selected from the group consisting of tin, indium, germanium, aluminum, gallium, silicon and lead. The common desirable characteristic of such metals is that they react with the above substrates to form intermetallic alloys, which are known per se, in the art, as having improved superconductivity characteristics compared to the respective substrates.

The materials of Saur and Allen and Stauffer offer the art ductile materials which can be wound into coils, yet exhibit high field superconducting properties similar to the brittle materials previously tought by the Kunzler et al. publication, Physical Review Letters, vol. 6, p. 89 (1961). The ductile materials of Saur and Allen and Stauffer are hereinafter referred to as open layered superconductors in contrast to the Kunzler et al. superconductors which contain cores of sintered strong superconductor powders enclosed by a low-field-quenched superconductor layer of niobium.

One problem observed with open layered superconductors is that when exposed to low fields their critical currents are severely lowered. This is an effect which limits the utility of such materials in coils because an initial small flow of current through a coil generates a low field. If this low field zone quenches the superconductivity of the material, then the coil never gets a chance to exhibit the high field superconductive characteristics of its component materials.

The present invention provides a modification of outside coated superconductors to avoid premature quenching at low fields. The modification generally comprises the interspersing of ferromagnetic materials in coils wound from open layered superconductors. The ferromagnetic material may be provided while working the superconductor or, later, while making the coil.

It is therefore the principal object of the invention to provide coils wound from open layered superconductors which are less subject to premature quenching.

It is a further object to provide, as articles of manufacture, coils wound from open layered superconductors, which can be operated through low self-generated fields without a protective external field.

It is a further object to provide, as articles of manufacture, open layered superconductors which can be wound into coils and operated at low fields without premature quenching.

Other objects of the invention will in part be obvious and will in part appear hereinafter.

The invention accordingly comprises the articles of manufacture, the selection of component materials therefor, their arrangement and construction in combination, the application of which will be indicated in the claims.

For a further understanding of the nature and objects of the invention, reference should be had to the following detailed description taken in connection with the accompanying drawings wherein.

The difficulty with open layered superconductors is that the substrate or some other region thereof is also a superconductor until quenched at low fields. This substrate quenching engenders conditions which prematurely quench the diffusion coating. For instance, a niobium foil about .001 inch thick with a diffusion coating of niobium stannide .0001 inch thick and known by the trademark, Niostan, can be wound into coils and held in liquid helium. Then, external fields, applied currents and self-generated fields will quench the composite at the expected quenching point of niobium at low fields. At high fields, quenching will occur near the expected quenching point of niobium stannide.

At very low fields, magnetic flux is substantially excluded from the superconductive niobium. Then the field and/or current is raised slightly and the superconductivity of the niobium is quenched. The flux collapses into the niobium rapidly and the sudden release of energy causes local heating and eddy currents which, added to the prevailing current, temperature, and field, may be sufficient to prematurely quench the superconductivity of the stannide coating.

In accordance with the present invention, I provide magnetic flux shunts within the coil. Then the quenching of the niobium layer or other low-field-quenched superconductive layer takes place more slowly. The shunts are preferably selected as materials having a magnetic saturation in excess of the critical field of the low-field-quenched superconductive substrate or region. Then the rate of impingement of magnetic forces into the niobium upon quenching is limited by the rate of leakage of fringing fields from the shunt. In other words, the shunt provides an inertia which slows down the collapse of energy into the niobium or other low-field quenched region. Consequently, the joule heating is prolonged for a longer time at lower temperatures. This slower heating can be dissipated to the helium and the niobium stannide survives the crises of niobium quenching.

The ferromagnetic material may be iron, nickel or cobalt or any other material which exhibits ferromagnetism at the cryogenic operating temperatures of the superconductor. Preferred materials are those whose magnetic saturation is above the critical field of the weak superconductor substrate of the outside coated superconductor.

Figure 1:
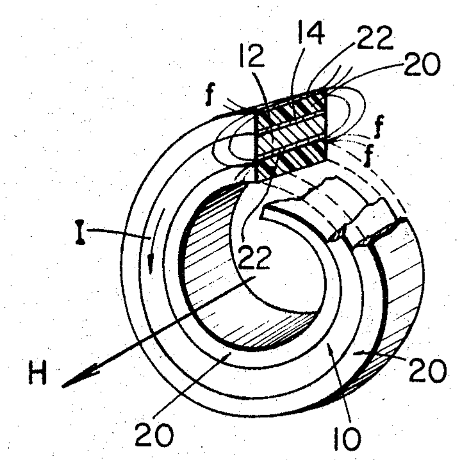
FIG. 1 is a schematic, partly sectional view of a coil turn in a coil made in accord with a first preferred embodiment of the invention.

Referring now to FIG. 1 there is shown a schematic view of a single turn of an open layered superconductor 10 in a coil carrying a current I and inducing a field H. The superconductor 10 comprises a niobium substrate 12 which is .001 inch thick with a niobium stannide coating of .0001 inch. The superconductor 10 is wound as a spiral. A Mylar foil 20 is also wound as a spiral and is interleaved with the superconductor to separate adjacent turns. The foil 20 is .0005 inch thick and has a thin coating 22 of iron thereon. The thickness of the coating of iron depends on the thickness of the niobium to be protected, the permeability of the iron and the spacing between niobium layers. In the present case, with .001 inch niobium layers separated by about .0005 inch and iron having a permeability of 1000 at the operating temperature of 4.2° K., the minimum thickness of the iron is $\frac{1}{1000}$ the niobium thickness, or .000001 inch. Even smaller thicknesses of iron are adequate where it exhibits anisotropy in the direction of local Maxwell lines of force *f*.

Many variations of the invention are possible. For instance the metal coated Mylar can be replaced by a magnetic tape or by an iron or nickel foil interleaved with the superconductor. In another variation of the invention, ferromagnetic coatings may be applied directly to the superconductor. Tests have shown that the presence of nickel on an outside coated superconductor does not disturb the high field characteristics. Ferromagnetic coatings, referred to above, can be applied in plating baths or by vapor deposition. It is also possible to prepare roll bonded clads of niobium and iron and then provide a diffusion coating of niobium stannide on the face of the niobium away from the iron.

Figure 2:
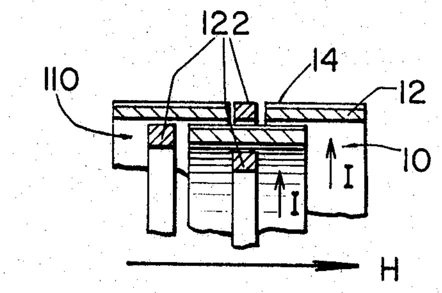
FIG. 2 is a schematic, partially sectional view of adjacent coil turns in a coil made in accord with a second embodiment.

Referring now to FIG. 2, there is shown a second embodiment of the invention which protects the open layered superconductor in a different fashion. Superconductor 10 is wound into a spiral coil with radially adjacent turns longitudinally offset. A flattened iron wire 122 is spirally wound between adjacent turns of superconductor. In FIG. 2, the iron acts quite differently from the iron arrangement of FIG. 1. In the FIG. 1 arrangement, the iron opposes the collapse of field into the niobium substrate 12. In the FIG. 2 arrangement, the iron tends to encourage the collapse of field into the niobium. But this occurs at lower currents and at an earlier point of coil operation when less energy has been stored in the coil. The niobium stannide layer 14 can survive this attenuated crisis of niobium quenching.

Figure 3:
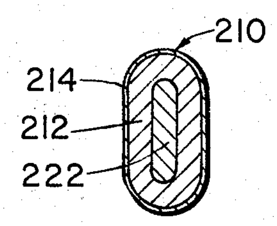
FIG. 3 is a schematic, partially sectional view of an alternate construction of open layered superconductors.

FIG. 3 shows a new construction of open layered superconductor which avoids the problems of low field flux jumping in the same manner as the above embodiment of FIG. 2. A niobium sheath is fitted about an iron cylinder and the composite drawn to wire and flattened to ribbon. A niobium stannide diffusion coating is prepared on the outer surface of the niobium. The resultant product is a superconductive ribbon 210 comprising an iron core 222 with an intermediate niobium layer 212 and an outer niobium stannide layer 214. The ribbon 210 is wound into a solenoid. The presence of the ferromagnetic core encourages the ribbon to go normal with the first low currents that are passed through the ribbon. The quenching of the niobium layer occurs at a time of low energy storage in the coil. This principle can also be applied to a round wire and other shapes, but ribbons are preferred. The ferromagnetic core can also be a cylinder with liquid helium flowing through it.

In the embodiments of FIGS. 1, 2 and 3, the iron serves to reduce the rate of energy release at the time of niobium quenching.

For simplicity of construction, the ferromagnetic material can be distributed throughout the superconductor coil. However, it is only necessary in those portions of the coil which are exposed to low field, generally the outermost turns. Tighter packing of the coil can be achieved by protecting only the outermost turns. The term open layered superconductors, used to describe the type of superconductor which can be protected by the present invention, also applies to alloy superconductors of inhomogeneous cross-section, such as niobium-zirconium, where different alloys of different quenching characteristics are arranged as adjacent superconductive layers of different quenching characteristics and the weaker, or low-field-quenched, layer does not enclose the stronger layer.

The invention is applicable to starting up of direct current solenoids, direct current coils exposed to changing external fields and to alternating current coils.

Since certain changes may be made in the above product and process without departing from the scope of the invention herein involved, it is intended that all matter contained in the above description or shown in the accompanying drawings shall be interpreted in an illustrative and not in a limiting sense.

What is claimed is:

1. An improved spirally wound superconductive electromagnet coil for generating high magnetic fields from electric current flowing through the coil, the coil being wound from wire comprising adjacent layers in the wire of first and second superconductive materials, the first superconductive material having superconductive characteristics improved as compared to those of the second superconductive material, the first superconductive material being arranged in open layer form, the improvement comprising ferromagnetic material disposed in the said coil in the form of a spiral winding adjacent the spiral winding of the coil and being constructed and arranged to channel magnetic field lines within the spiral windings of the coil along a spiral path adjacent the said second superconductive material.

2. An improved superconductive coil spirally wound from a first coated ribbon, the ribbon comprising a metal substrate selected from the group consisting of niobium, vanadium and tantalum and an outer superconductive diffusion coating comprising the reaction product of the substrate and a metal selected from the group consisting of tin, indium, germanium, aluminum, gallium, silicon and lead, the coating having superconductive characteristics improved as compared to those of the substrate, the improvement comprising a layer of ferromagnetic material disposed within the said winding of the superconductive coil as a second spiral adjacent the said substrate of the said coated ribbon.

3. The coil of claim 2 wherein the ferromagnetic material layer is part of a ribbon having a width at least as wide as the superconductive ribbon.

4. The coil of claim 2 wherein the ferromagnetic material layer is a wire having a lesser width than the superconductive ribbon and is disposed between longitudinally adjacent turns of the ribbon and wherein radially adjacent turns of the superconductive ribbon are longitudinally offset from each other.

5. The coil of claim 2 wherein the ferromagnetic material is an integral part of the said ribbon.

References Cited by the Examiner

UNITED STATES PATENTS

| | | | |
|---|---|---|---|
| 2,946,030 | 7/1960 | Slade. | |
| 3,116,422 | 12/1963 | May et al. | 338—32 |
| 3,181,936 | 5/1965 | Denny et al. | |
| 3,187,235 | 6/1965 | Berlincourt et al. | |

BERNARD A. GILHEANY, *Primary Examiner.*

G. HARRIS, Jr., *Assistant Examiner.*